(12) United States Patent
Baldwin et al.

(10) Patent No.: US 8,937,247 B1
(45) Date of Patent: Jan. 20, 2015

(54) MOUNTING PLATE FOR MOUNTING AN ELECTRICAL DEVICE TO AN ELECTRICAL DEVICE BOX

(75) Inventors: Jeffrey P. Baldwin, Phoenix, AZ (US); Samuel Dumpe, Beaver, PA (US)

(73) Assignee: Hubbell Incorporated, Shelton, CT (US)

(*) Notice: Subject to any disclaimer, the term of this patent is extended or adjusted under 35 U.S.C. 154(b) by 272 days.

(21) Appl. No.: 13/525,196

(22) Filed: Jun. 15, 2012

Related U.S. Application Data

(60) Provisional application No. 61/497,495, filed on Jun. 15, 2011.

(51) Int. Cl.
*H02G 3/08* (2006.01)
*H02G 3/16* (2006.01)

(52) U.S. Cl.
USPC ............ 174/54; 174/50; 174/53; 174/61; 29/525.01; 29/525.11

(58) Field of Classification Search
USPC .......... 174/50, 53, 54, 61; 29/525.01, 525.11
See application file for complete search history.

(56) References Cited

U.S. PATENT DOCUMENTS

| | | | | |
|---|---|---|---|---|
| 2,149,719 A | * | 3/1939 | Arnest | 220/3.4 |
| 2,228,584 A | * | 1/1941 | Piace | 411/172 |
| 2,233,230 A | * | 2/1941 | Tinnerman | 411/175 |
| 3,088,560 A | * | 5/1963 | Preuss | 312/265.6 |
| 3,114,792 A | * | 12/1963 | Duffield | 174/54 |
| 3,187,084 A | * | 6/1965 | Stillman et al. | 174/58 |
| 3,340,349 A | * | 9/1967 | Zerwes | 174/53 |
| 3,575,313 A | * | 4/1971 | Trachtenberg et al. | 220/3.3 |
| 3,770,872 A | * | 11/1973 | Brown | 174/53 |
| 3,895,732 A | * | 7/1975 | Robinson et al. | 220/3.5 |
| 3,910,156 A | * | 10/1975 | Soltysik | 411/61 |
| 3,955,463 A | * | 5/1976 | Hoehn | 411/548 |
| 4,012,580 A | * | 3/1977 | Arnold | 174/53 |
| 4,036,389 A | * | 7/1977 | Pate et al. | 220/3.8 |
| 4,105,862 A | * | 8/1978 | Hoehn | 174/53 |
| 4,130,335 A | * | 12/1978 | Kinney | 439/535 |
| 4,133,245 A | * | 1/1979 | Ruihley et al. | 411/80.1 |
| 4,188,854 A | | 2/1980 | Hoehn | |
| 4,215,787 A | * | 8/1980 | Moran et al. | 220/3.6 |
| 4,281,773 A | * | 8/1981 | Mengeu | 220/3.2 |
| 4,295,003 A | * | 10/1981 | Borja et al. | 174/53 |
| 4,529,834 A | * | 7/1985 | Nattel | 174/53 |
| 4,580,689 A | * | 4/1986 | Slater | 220/3.2 |
| 4,642,420 A | * | 2/1987 | Nattel | 174/53 |
| 4,936,396 A | * | 6/1990 | Lockwood | 174/53 |

(Continued)

*Primary Examiner* — Jeremy C Norris
*Assistant Examiner* — Nathan Milakovich
(74) *Attorney, Agent, or Firm* — Roylance, Abrams, Berdo & Goodman, L.L.P.

(57) ABSTRACT

A electrical device mounting box that includes a device mounting plate with a screw coupler is disclosed. The electrical device mounting box and device mounting plate may be used to mount an electrical outlet receptacle. Specific implementations of the device mounting plate allow a screw to be pushed through a screw aperture on the device mounting plate and a coupling aperture on the screw coupler without rotation of the screw. The coupling aperture may bias away from the mounting plate as the screw is pushed through the coupling aperture. The coupling aperture may also include threading that engages with screw threading. Once the screw is pushed through the screw aperture and coupling aperture, the screw may be rotated to engage the screw with the screw coupler, thus biasing the screw coupler toward the device mounting plate. The screw coupler may include either a one or two piece screw coupler.

13 Claims, 5 Drawing Sheets

(56) References Cited

U.S. PATENT DOCUMENTS

| | | | |
|---|---|---|---|
| 4,960,964 A | * | 10/1990 | Schnell et al. .................. 174/51 |
| 4,978,318 A | * | 12/1990 | Wiley et al. .................. 439/536 |
| 5,594,205 A | * | 1/1997 | Cancellieri et al. ............. 174/53 |
| 5,837,936 A | * | 11/1998 | Rogers et al. ................ 174/650 |
| 5,907,126 A | * | 5/1999 | Cancellieri et al. ............. 174/54 |
| 6,420,654 B1 | | 7/2002 | Shotey et al. |
| 6,563,051 B1 | | 5/2003 | Shotey et al. |
| 7,151,220 B1 | * | 12/2006 | Rubin de la Borbolla ...... 174/58 |
| 7,479,030 B2 | * | 1/2009 | Tiberio ........................ 439/538 |
| 8,087,862 B1 | * | 1/2012 | Smith ........................... 411/174 |
| 8,347,491 B1 | * | 1/2013 | Baldwin et al. ................. 29/758 |
| 8,650,743 B2 | * | 2/2014 | Baldwin et al. ................. 29/756 |
| 8,674,219 B2 | * | 3/2014 | Korcz et al. .................... 174/50 |

* cited by examiner

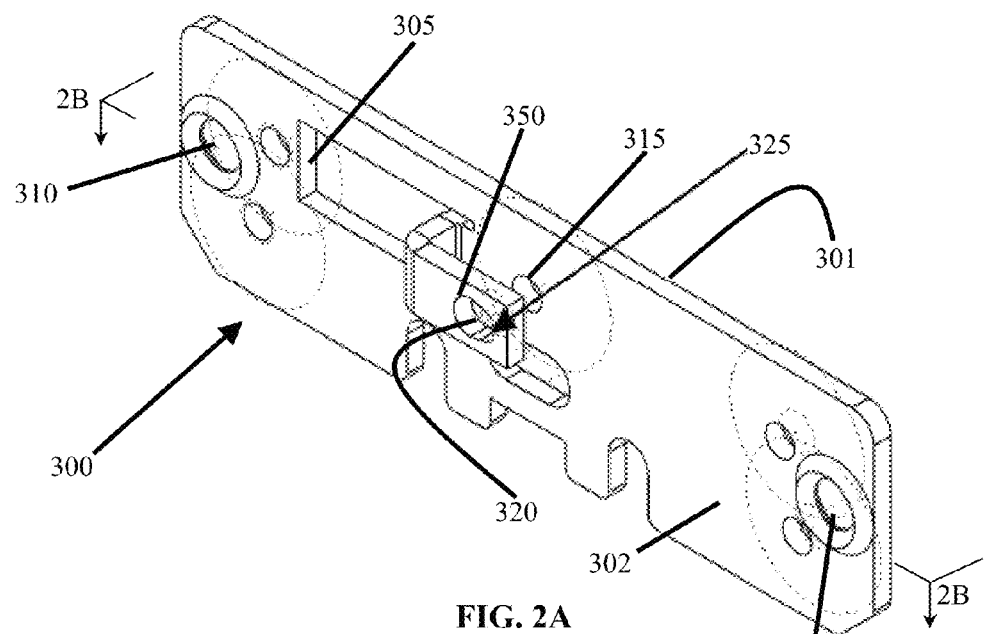
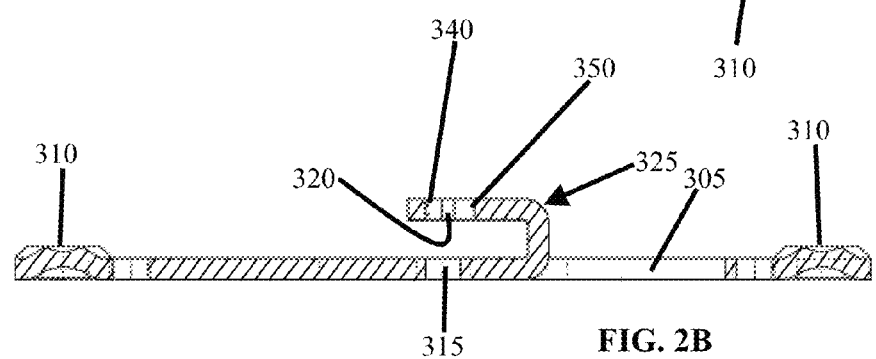

MOUNTING PLATE FOR MOUNTING AN ELECTRICAL DEVICE TO AN ELECTRICAL DEVICE BOX

CROSS REFERENCE TO RELATED APPLICATIONS

This document claims the benefit of the filing date of U.S. Provisional Patent Application 61/497,495, entitled "Metal Wallplate Box Mounting Plates with Zip Thread" to Baldwin which was filed on Jun. 15, 2011, the contents of which are hereby incorporated by reference.

BACKGROUND

1. Technical Field

Aspects of this document relate generally to electrical device mounting box assemblies.

2. Background Art

Electrical device mounting boxes are widely used for housing electrical outlet receptacles. Mounting plates coupled to the electrical device mounting boxes are often utilized to mount the electrical outlet receptacles within the electrical device mounting box. When coupling an electrical device to a mounting plate, a user is required to turn the screw once the tip of the screw engages the mounting plate and until the screw head is flush with the plate.

SUMMARY

Aspects of this document relate to electrical device mounting box assemblies. In one aspect, an electrical device mounting box assembly comprising an electrical device mounting box and a device mounting plate is contemplated. The electrical device mounting box comprises four side walls bordering a front opening. Two box screw mounts extend into the box from at least one of the four side walls. The device mounting plate comprises two box screw mounting apertures aligned with the two box screw mounts. The device mounting plate further comprises a first side, a second side opposite the first side, an unthreaded device screw aperture extending through mounting plate, and a flexible screw coupler extending outwardly from the second side of the mounting plate. The screw coupler comprises a coupling aperture threaded on at least a first threaded portion of the coupling aperture. The threaded first portion is aligned with the device screw aperture such that when a screw passes through the device screw aperture and the coupling aperture, the screw threadedly engages with the screw coupler at the coupling aperture.

Particular implementations may include one or more of the following. The electrical device mounting box may comprise a metal electrical device mounting box, the device mounting plate may comprise a metal mounting plate, and the screw coupler may comprise a metal screw coupler. The screw coupler may comprise a single piece screw coupler extending outwardly from the second side of the device mounting plate and over the unthreaded device screw aperture, and the coupling aperture may extend through the single piece screw coupler. The coupling aperture may comprise an oblong coupling aperture. A radius of a threading peak on the threaded first portion may be less than a radius of the unthreaded device screw aperture. The screw coupler may comprise two arms that extend outwardly from the second side of the device mounting plate directionally toward one another. The two arms may each comprise a terminating end bordering the coupling aperture. At least one terminating end of the two arms may comprise the threaded first portion of the coupling aperture. A distance of the coupling aperture between peaks of the first threaded end and the opposing terminating end may be less than a diameter of the unthreaded device screw aperture, and the two arms of the flexible screw coupler may bias away from the second side of the mounting plate when a screw is pushed through screw coupler.

An apparatus for use in mounting an electrical device in an electrical device mounting box is also disclosed. In one aspect, the apparatus comprises a plate, two box screw mounting apertures extending through the plate, an unthreaded device screw aperture extending through the plate, a flexible screw coupler extending outwardly from the plate. The flexible screw coupler comprises a coupling aperture threaded on at least a first threaded portion of the coupling aperture and aligned with the unthreaded device screw aperture such that when a screw passes through the unthreaded device screw aperture and the coupling aperture, the screw engages threadedly engages with the screw coupler at the coupling aperture.

Particular implementations may include one or more of the following. The mounting plate may comprise a metal mounting plate and the screw coupler may comprise a metal screw coupler. The screw coupler may comprise a single piece screw coupler extending outwardly from the device mounting plate and over the unthreaded device screw aperture, and the coupling aperture may extend through the single piece screw coupler. The coupling aperture may comprise an oblong coupling aperture. A radius of a threading peak on the threaded first portion may be less than a radius of the unthreaded device screw aperture. The screw coupler may comprise two arms that extend outwardly from the device mounting plate directionally toward one another, the two arms each comprising a terminating end bordering the coupling aperture. At least one terminating end of the two arms may comprise the threaded first portion of the coupling aperture. A distance of the coupling aperture between peaks of the first threaded end and the opposing terminating end may be less than a diameter of the unthreaded device screw aperture, and the two arms of the flexible screw coupler may bias away from the second side of the mounting plate when a screw is pushed through screw coupler.

A method for mounting an electrical outlet receptacle to an electrical mounting box is also contemplated. In one aspect, the method comprises coupling a device mounting plate to a electrical device mounting box. The electrical device mounting box comprises four side walls bordering a front opening. The device mounting plate comprises an unthreaded device screw aperture extending through the mounting plate and a screw coupler extending outwardly from an interior side of the device mounting plate. The screw coupler comprises a coupling aperture threaded on at least a first threaded portion and aligned with the unthreaded device screw aperture. The method also comprises aligning a screw hole on a receptacle mount of an electrical outlet receptacle with the aligned unthreaded device screw aperture and coupling aperture. The method also comprises pushing a screw through the aligned screw hole of the receptacle mount, unthreaded device screw aperture, and coupling aperture until a head of the screw abuts the receptacle mount. The method also comprises rotatably engaging the screw with the coupling aperture of the screw coupler after the screw has been pushed through the aligned screw hole of the receptacle mount, unthreaded device screw aperture, and coupling aperture to abut the receptacle mount.

Particular implementations may include one or more of the following. Rotatably engaging the screw with the coupling aperture of the screw coupler may comprise rotatably engaging the screw with the coupling aperture of the screw coupler, the screw coupler comprising a single piece screw coupler and the coupling apertures comprises an oblong hole through the single piece screw coupler. Rotatably engaging the screw with the coupling void of the screw coupler may comprise rotatably engaging the screw with the coupling void formed between two terminating ends of two opposing arms of the screw coupler.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 2A is a rear perspective view of a first implementation of a device mounting plate;

FIG. 2B is a cross-sectioned view of the first implementation of a device mounting plate;

DESCRIPTION

This disclosure, its aspects and implementations, are not limited to the specific components or assembly procedures disclosed herein. Many additional components and assembly procedures known in the art consistent with the intended electrical device mounting box assembly and/or assembly procedures for an electrical device mounting box will become apparent for use with implementations of electrical device mounting boxes, device mounting plates, and electrical outlet receptacles from this disclosure. Accordingly, for example, although particular device mounting plates, electrical outlet receptacles, or electrical device mounting boxes, is disclosed, such device mounting plates, electrical outlet receptacles, or electrical device mounting boxes, and implementing components may comprise any shape, size, style, type, model, version, measurement, concentration, material, quantity, and/or the like as is known in the art for such device mounting plates, electrical outlet receptacles, or electrical device mounting boxes, and implementing components, consistent with the intended operation of electrical device mounting box assemblies.

Electrical device mounting boxes are often used for housing electrical outlet receptacles. Mounting plates coupled to the electrical device mounting boxes are often utilized to mount the electrical outlet receptacle within the electrical device mounting box. Various aspects of disclosures presented herein improve upon prior electrical device mounting boxes by presenting a system and method that allows a user to push, without rotating, a screw through holes in the receptacle mount, the mounting plate, and a screw coupler until the screw head is substantially flush with the receptacle mount. Once pushed until the screw head meets the receptacle mount, the screw may be quickly rotated to finalize the coupling. Implementations disclosed herein may be referred to as a "zip thread" feature that allow a user to push the screw into the mounting plate, rather than requiring a user to turn the screw once the tip of the screw meets the plane of the mounting plate.

Figure 1:
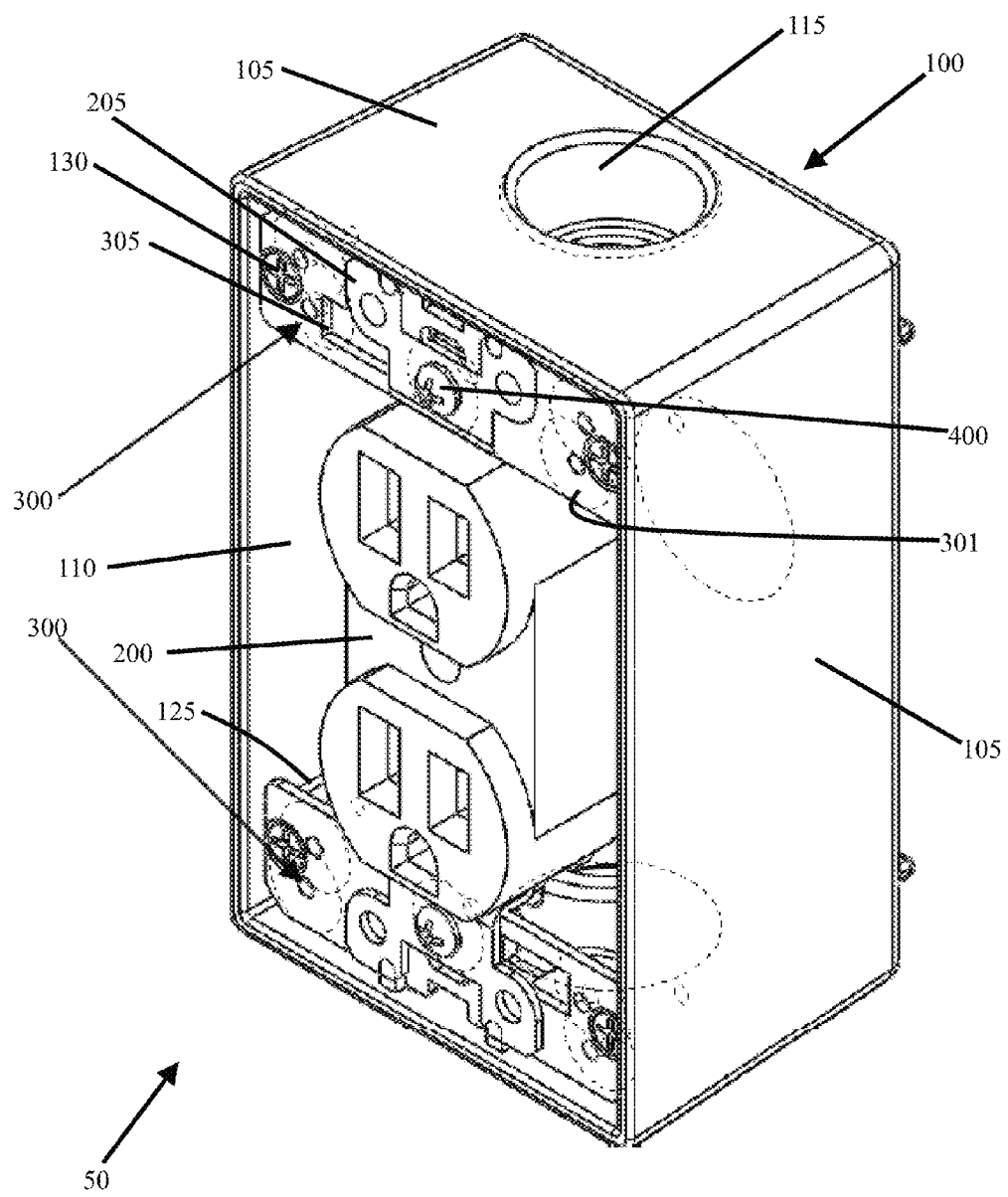
FIG. 1 is a perspective view of an electrical device mounting box assembly.

As illustrated in FIG. 1, one aspect of an electrical device mounting box assembly 50 comprises a device mounting plate 300 coupled to an electrical device mounting box 100. FIG. 1 further illustrates an electrical outlet receptacle 200 coupled to the device mounting plate 300. Although a particular electrical outlet receptacle 200 is shown in FIG. 1, any electrical outlet receptacle known in the art is contemplated for use with an electrical device mounting box assembly 50. The electrical outlet receptacle 200 is typically coupled to a receptacle mount 205. Receptacle mount 205 may comprise a substantially planar surface that abuts the mounting plate 300 with the electrical device mounting box assembly 50 is assembled. Although not visible in FIG. 1, receptacle mount 205 comprises a screw hole that may be aligned with an unthreaded device screw aperture 315 and coupling void 320, 520 (shown in FIGS. 2 and 3, respectively) to mount the electrical outlet receptacle 200 within the electrical device mounting box 100.

Electrical device mounting box 100 may comprise any electrical device mounting box known in the art. In the implementation shown in FIG. 1, electrical device mounting box 100 comprises four side walls 105 that form a boundary of a front opening 110. A back wall opposite the front opening 110 may comprise an opening or a closed wall. Although the implementation shown in FIG. 1 illustrates an electrical device mounting box 100 comprising four side walls 105, an electrical device mounting box 100 with less than or greater than four side walls 105 is also contemplated for use with an electrical device mounting box assembly 50. The electrical device mounting box 100 shown in FIG. 1 further comprises a hole 115 for coupling to a conduit. Other implementations may similarly comprise holes for conduits or other wiring known in the art.

Electrical device mounting box 100 further comprises screw mounts 125 for coupling the device mounting plate 300 to the electrical device mounting box 100. The screw mounts 125 are typically on opposing walls of the four side walls 105 such that the device mounting plate 300 may extend between the two opposing side walls of the four side walls 105. Device mounting plate 300 comprises corresponding screw holes 310 on opposing ends of the device mounting plate 300 that align with the screw mounts 125. Alternatively, the screw mounts 125 may be coupled to a single wall of the four side walls 105. Once the screw holes 310 of the device mounting plate and the screw mounts 125 are aligned, a screw 130 may be inserted through a screw hole 310 to the screw mount 125, thus coupling the device mounting plate to the electrical device mounting box 100. In still other implementations, the device mounting plate 300 may be coupled to the electrical device mounting box 100 through a variety of elements known in the art. Although disclosures presented herein may be utilized with a variety of materials, the electrical device mounting box 100 of FIG. 1 is comprised of a metal material.

As shown in FIG. 1, device mounting plate 300 is coupled to the electrical mounting box 100, with a first side 301 substantially parallel with a plane formed by the front opening 110 of the electrical mounting box 100. FIGS. 2A and 2B illustrate two views of device mounting plate 300 separate from electrical mounting box 100. Although disclosures presented herein may be utilized with a variety of materials, the device mounting plate 300 of FIG. 2 is comprised of a metal material.

In FIG. 2A, a rear perspective view of device mounting plate 300 is shown that illustrates the second side 302 of mounting plate 300. FIG. 2B illustrates a cross-sectioned view of the device mounting plate 300 of FIG. 2A at line 2B. As shown and previously noted, mounting plate 300 comprises an unthreaded device screw aperture 315 that extends from the first side 301 through to the second side 302 of device mounting plate 300. Although referred to as an unthreaded device screw aperture throughout the specification, in some implementations the device screw aperture may in fact comprise threading. In such an implementation, the threaded device screw aperture would typically comprise a larger diameter than the coupling aperture 320, 520.

An aspect of the device mounting plate further comprises a screw coupler 325. In the implementation shown in FIGS. 2A and 2B, the screw coupler comprises a single piece screw coupler 325 that extends outwardly from the second side 302 of the device mounting plate 300. In other implementations, the screw coupler 325 may comprise any piece or pieces coupled to or extending from the device mounting plate 300 with a coupling aperture 320 that aligns with the unthreaded device screw aperture 315. Although not required, the screw coupler 325 may comprise a flexible metal screw coupler that biases away from the second side 302 of the device mounting plate 300 as a screw is pushed through a coupling aperture 320.

As previously noted, the screw coupler 300 comprises a coupling aperture 320 at least partially aligned with the unthreaded device screw aperture 315. Such an alignment allows a screw to pass through both the unthreaded device screw aperture 315 and the coupling aperture 320. In the implementation shown in FIG. 2A, the coupling aperture 320 comprises an oblong shape or border 350 the coupling aperture. In one aspect and as shown in FIG. 2B, one rounded portion of the oblong border 350 is aligned with the border of the unthreaded device screw aperture 315, while the other opposing rounded portion of the oblong border 350 is not aligned with the opposing border of the unthreaded device screw aperture 315.

In other implementations, the coupling aperture 320 may comprise two incomplete or semi-circles with offset center points and differing radii. In such an implementation, the border of the semi-circle comprising the smaller radius is typically aligned with a portion of the border of the unthreaded device screw aperture 315, while the border of the semi-circle comprising the larger radius is offset from the border of the unthreaded device screw aperture 315.

According to one aspect, at least a portion of the coupling aperture 320 is threaded. In FIG. 2B, the rounded portion of the oblong border 350 aligned with a border of the unthreaded device screw aperture 315 comprises threading 340. The radius of the peak of the threading 340 is typically smaller radius than a radius of the unthreaded device screw aperture 315, although such sizing is not always required. In other implementations, the opposing side of the oblong border 350, or alternatively both rounded sides of the oblong border 350 of the coupling aperture 320 may comprise threading 340.

In these and other implementations comprising threading 340 on the coupling aperture 320, a screw 400 may be inserted through a portion of the coupling aperture 320 without threading 340, then moved or slid to the portion of the coupling aperture 320 with threading 340. This allows the screw 400 to threadedly engage with the screw coupler 325 at the coupling aperture 320.

In other implementations, the coupling aperture 320 may comprise a lip or some other protrusion that may engage with a screw 400. For example, in another implementation, a portion of the oblong border 350 of the coupling aperture 320 may comprise a lip that extends inwardly toward the center of the coupling aperture. A screw 400 may then be inserted through the coupling aperture 320 at a portion of the coupling aperture without a lip, and then slid over to the portion of the coupling aperture 320 comprising a lip to engage the screw coupler 325 with the screw 400.

As shown in FIGS. 2A and 2B, the device mounting plate may further comprise a hole 305 or void adjacent to the screw coupler 325. The hole 305 is typically remains after the screw coupler 325 is cut and bent away from the device mounting plate 300. In other implementations, the hole 305 may be covered by other pieces, or the screw coupler 325 may comprise a piece separately coupled to the device mounting plate 300. In the implementations shown in FIGS. 1-2, however, the screw coupler 325 is originally formed with the device mounting plate 300, and then cut or bent away from the mounting plate 300 to form the screw coupler 325. Such a configuration is advantageous in manufacture of the mounting plate 300 with a screw coupler 325.

Figure 3A:
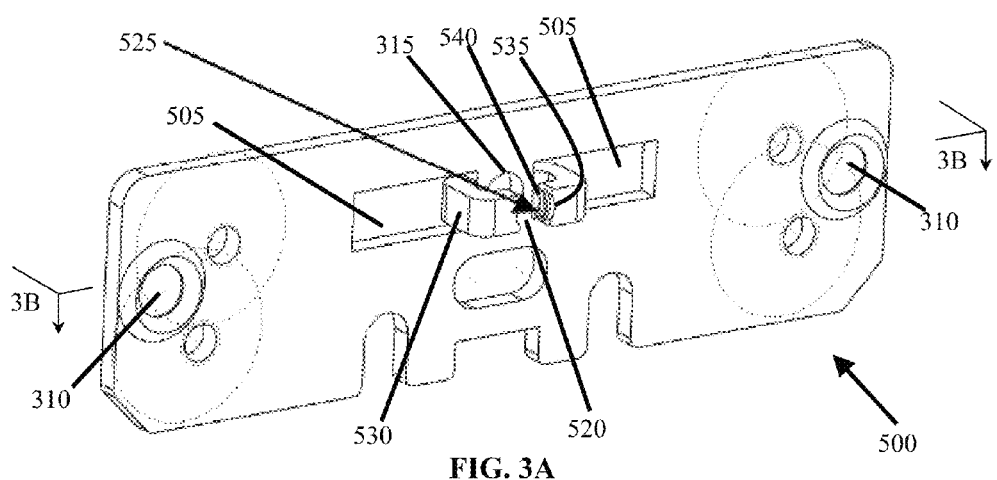
FIG. 3A is a rear perspective view of a second implementation of a device mounting plate.
Figure 3B:
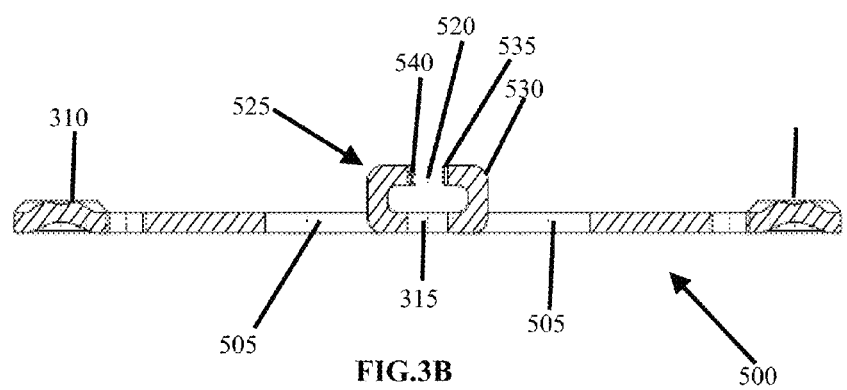
FIG. 3B is a cross-sectioned view of the second implementation of a device mounting plate.

FIGS. 3A and 3B show another implementation of a device mounting plate 500. While FIG. 3A shows device mounting plate 500 from a rear perspective view, FIG. 3B shows a cross-sectioned view of the implementation of FIG. 3A taken at line 3B. Similar to device mounting plate 300, device mounting plate 500 shown in FIGS. 2A and 2B comprises corresponding screw holes 310 on opposing ends of the device mounting plate 500 that align with the screw mounts 125. Furthermore, device mounting plate 500 likewise comprises an unthreaded screw aperture 315 similar to the unthreaded screw aperture 315 described in relation to device mounting plate 300.

Device mounting plate 500 further comprises a flexible screw coupler 525 comprising a coupling aperture 520. In the implementation shown in FIGS. 3A and 3B, however, the flexible screw coupler 525 comprise two opposing arms 530 extending outward from the second side 302 of device mounting plate 500. The two opposing arms 530 are further bent or otherwise directed toward one another to form the coupling aperture 520 between terminating ends 535 of the two opposing arms 530. Like other coupling apertures previously described, coupling aperture 520 is aligned with the unthreaded device screw aperture 315.

According to one aspect, coupling aperture 520 of device mounting plate 500 is between the two terminating ends 535 of the two opposing arms 530, with no other boundaries or borders besides the terminating ends 535. In other implementations, however, additional elements may be added to form top and/or bottom boundaries to the coupling aperture 520 without departing from the scope of this disclosure. The implementation shown in FIGS. 2A and 2B comprises curved or semi-circle terminating ends 535 that form opposing borders of coupling aperture 520. In other implementations, however, one or both of the terminating ends 535 may comprise a planar surface. Such an implementation may further comprise a curved or semi-circle threading, lip, or groove configured to engage with screw threading of screw 400.

In a particular implementation, one terminating end 535 of the two opposing arms 530 comprises threading 540 such that a first portion of coupling aperture 520 comprises a threaded first portion. In other implementations, both terminating ends 535 of two opposing arms 530 comprise threading 540. In still other implementations, neither terminating end 535 comprises threading 540, but instead at least one terminating end may comprise a lip or groove configured to engage with screw threading.

For example, an implementation may comprise a lip on a portion of the of at least one terminating end 535 proximate to device mounting plate 500, or alternatively on a portion of the terminating end distal to device mounting plate 500. The lip may protrude outwardly from the terminating end and be sized to fit between threading on screw 400 or otherwise engage with screw 400. In another implementation, at least one of the terminating ends 535 comprises at least one groove located anywhere on the terminating end 535 and sized to engage with threading on screw 400.

The two opposing arms 530 of flexible screw coupler 525 are typically comprised of a flexible material, such as metal, and configured to flex or bias away from the second side 302 of device mounting plate 500 as a screw 400 is pushed through coupling aperture 520. According to one aspect, when threading on screw 400 contacts one or both terminating ends 535 of the two opposing arms 530, or threading 540 located thereon, coupling aperture 520 expands to allow passage of at least a portion of screw 400 through the coupling aperture 520 until the head 405 of screw 400 abuts the receptacle mount 205 or the device mounting plate 300. When the head 405 of screw 400 abuts the receptacle mount 205 or the device mounting plate 300, screw 400 may be rotated to complete engagement of the threading 540 and the threads of screw 400.

The distance between terminating ends 535 is typically less than the diameter or horizontal length of the unthreaded device screw aperture 315. This distance between the terminating ends 535 may be measured as the distance between the terminating ends 535 themselves, or alternatively the distance between the peaks or ridges of the threading 540 on one of the terminating ends 535 and the opposite terminating end 535 in an implementation with threading on only one terminating end 535. In an implementation comprising threading 540 on both terminating ends 535, the distance between the terminating ends may be measured as the distance between the peaks or ridges of the threading 540 of the two terminating ends 535.

As shown in FIGS. 3A and 3B, the device mounting plate 500 may further comprise at least one hole 505 or void adjacent to each arm 530 of screw coupler 525. The hole 505 typically remains after the two opposing arms 530 of screw coupler 525 is cut and bent away from the device mounting plate 500. In other implementations, the hole 505 may be covered by other pieces, or the screw coupler 525 may comprise a piece separately coupled to the device mounting plate 500. In the implementations shown in FIGS. 3A and 3B, however, the screw coupler 525 is originally formed with the device mounting plate 500, and then cut or bent away from the mounting plate 500 to form the screw coupler 525. Such a configuration is advantageous in manufacture of the mounting plate 500 with a screw coupler 525.

Figure 4A:
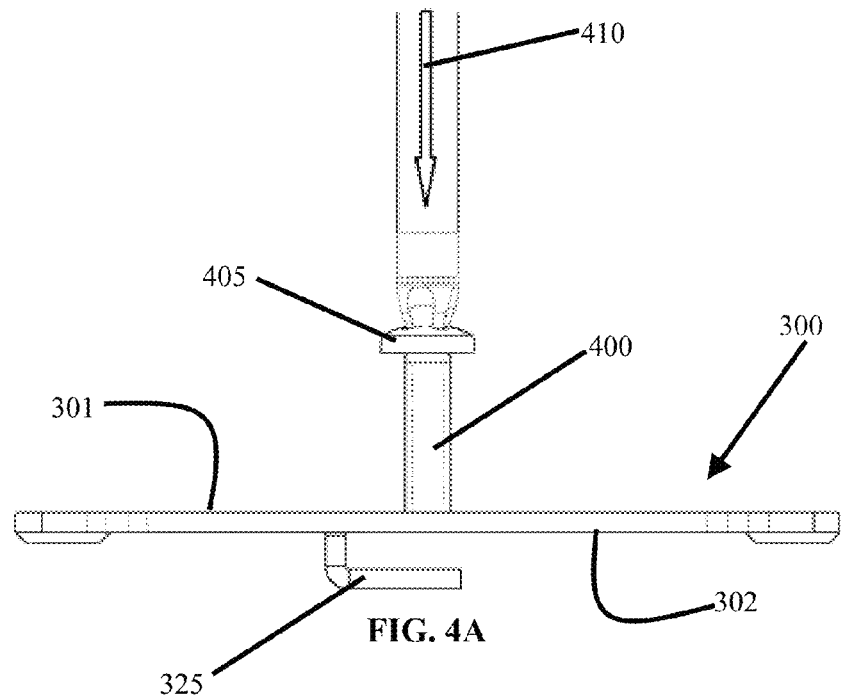
FIG. 4A is a side view of a first stage of engaging a screw with a device mounting plate.
Figure 4B:
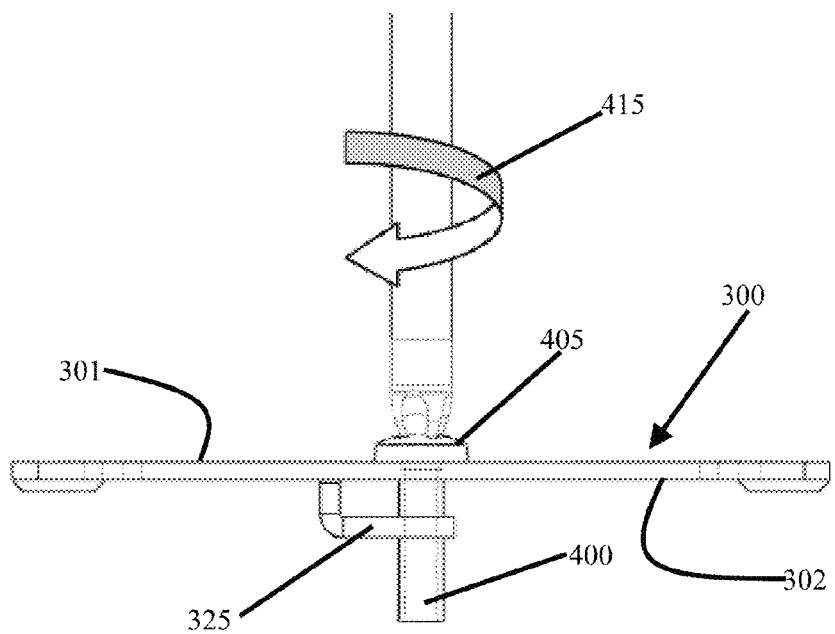
FIG. 4B is a side view of a second stage of engaging a screw with a device mounting plate.
Figure 5:
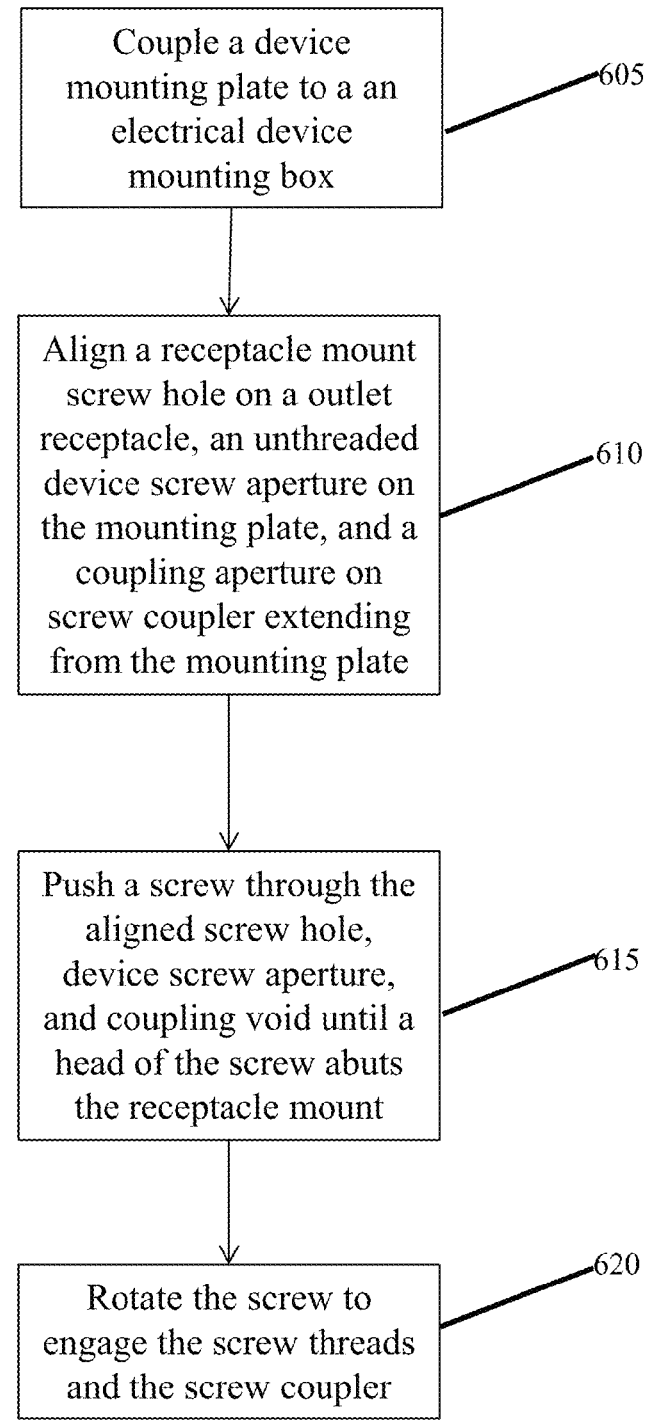
FIG. 5 is a flowchart describing a method for mounting an electrical outlet receptacle to an electrical device mounting box.

FIGS. 4A and 4B illustrate side views of inserting and engaging a screw 400 with device mounting plate 300 at two different stages that shall be described in greater detail in relation FIG. 5. In FIG. 4A, a screw 400 is aligned with unthreaded screw aperture 315 (not visible) and coupling aperture 320 (not visible). Although not shown in this figure, a receptacle mount 205 is typically between the head 405 of screw 400 and the device mounting plate 300.

As represented by arrow 410, a force substantially perpendicular to plate 300 is applied to screw 400 to push the screw, without rotating the screw, through the mounting plate 300 (at unthreaded device screw aperture 315) and the flexible screw coupler 325 (at coupling aperture 320). This force substantially perpendicular to the device mounting plate 300 may be exerted until the head 405 of screw 400 abuts the first side 301 of device mounting plate 300, or receptacle mount 205 (if present).

In FIG. 4B illustrates a side view of a screw 400 and device mounting plate 300 after the screw 400 has been pushed through the unthreaded device screw aperture 315 and coupling aperture 320 until the head 405 of screw 400 is abutting the first side 301 of mounting plate 300. As represented by arrow 415, the screw 400 may then be rotated to engage and/or tighten the screw 400 within device mounting plate 300.

FIG. 5 is a flowchart describing various actions associated with a method for mounting an electrical outlet receptacle 200 to an electrical device mounting box 100. In a particular implementation, the method comprises coupling a device mounting plate 300, 500 to an electrical device mounting box 100 (step 605). The electrical device mounting box 100 utilized in this method may comprise any electrical device mounting box disclosed herein or otherwise known in the art. In a particular implementation, the electrical device mounting box 100 utilized in this aspect of the method comprises four side walls 105 bordering a front opening 110. The device mounting plate 300, 500 utilized in this method may comprise any device mounting plate 300, 500 disclosed herein. In a particular implementation, the device mounting plate 300, 500 utilized in the method comprises an unthreaded device screw aperture 315 that extends through the device mounting plate 300, 500. The screw coupler 325, 525 typically further comprises a coupling aperture 320, 520 threaded on at least a first threaded portion and aligned with the unthreaded device screw aperture 315.

A particular implementation of a method for mounting an electrical outlet receptacle 200 to an electrical device mounting box 100 further comprises aligning a screw hole on a receptacle mount 205 of an electrical outlet receptacle 200 with the aligned unthreaded device screw aperture 315 and coupling aperture 320, 520 (step 610). The electrical outlet receptacle 200 utilized in this aspect of the method may comprise any electrical outlet receptacle known in the art.

A particular implementation of a method for mounting an electrical outlet receptacle 200 to an electrical device mounting box 100 further comprises pushing a screw 400 through the aligned screw hole, device screw aperture 315, and coupling aperture 320, 520 until a head 405 on the screw 400 abuts the receptacle mount 205 (step 615). The screw 400 may typically be pushed through the screw hole, screw aperture 315, and coupling aperture 320, 520 without rotating the screw 400. The screw 400 utilized in this aspect of the method may comprise any screw known in the art. In a particular implementation, the screw 400 comprises threading on at least a portion of the screw shaft, and a head 400. The screw 400 and/or the screw hole and device screw aperture 315 are typically sized to allow the shaft of the screw 400 to pass through the screw hole and the device screw aperture 315 without substantially contacting the borders of the screw hole and device screw aperture 315 (other than insignificant incidental contact). As previously described, as the screw 400 passes through the coupling aperture, the threading on the screw 400 may in some implementations contact portions of the coupling aperture 320, 520 or threading 540 on the coupling aperture, thus biasing the flexible screw coupler 325, 525 away from the device mounting plate 300, 500 as the screw 400 passes through the coupling aperture 320, 520.

A particular implementation of a method for mounting an electrical outlet receptacle 200 to an electrical device mounting box 100 further comprises rotating the screw 400 to engage screw threads with the screw coupler 325, 525 (step 620). Rotatably engaging the threads of the screw 400 with the coupling aperture 320, 520 biases the screw coupler 325, 525 toward the device mounting plate 300, 500, thus securing the receptacle mount 205 between the head 405 of the screw 400 and the device mounting plate 300, 500.

It will be understood that implementations are not limited to the specific components disclosed herein, as virtually any components consistent with the intended operation of a method and/or system implementation for mounting an electrical outlet receptacle to an electrical device mounting box may be utilized. Accordingly, for example, although particular electrical device mounting boxes, device mounting plates, and electrical outlet receptacles may be disclosed, such components may comprise any shape, size, style, type, model, version, class, grade, measurement, concentration, material, weight, quantity, and/or the like consistent with the intended operation of a method and/or system implementation for mounting an electrical device to an electrical device mounting box may be used.

In places where the description above refers to particular implementations of device mounting plates, electrical outlet receptacles, or electrical device mounting boxes, it should be readily apparent that a number of modifications may be made without departing from the spirit thereof and that these implementations may be applied to other device mounting plates, electrical outlet receptacles, or electrical device mounting boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical device mounting box assembly, comprising:
   an electrical device mounting box comprising four side walls bordering a front opening;
   two box screw mounts extending into the box from at least one of the four side walls;
   a device mounting plate comprising two box screw mounting apertures aligned with and coupled to the two box screw mounts by screws, a first side, a second side opposite the first side, an unthreaded device screw aperture extending through the device mounting plate, and a flexible screw coupler extending outwardly from the second side of the device mounting plate, the flexible screw coupler comprising an oblong coupling aperture having a longitudinal dimension with a first longitudinal end and a second longitudinal end and a length greater than a diameter of a coupling screw, a threaded portion on said first longitudinal end of said coupling aperture aligned with the unthreaded device screw aperture such that when a screw passes through the unthreaded device screw aperture and the coupling aperture, the screw threadedly engages with the flexible screw coupler at the coupling aperture.

2. The assembly of claim 1, wherein the electrical device mounting box comprises a metal electrical device mounting box, the device mounting plate comprises a metal mounting plate, and the screw coupler comprises a metal screw coupler.

3. The assembly of claim 2, wherein the screw coupler comprises a single piece screw coupler having a first portion integrally formed with and extending outwardly from the second side of the device mounting plate and a second portion extending over the unthreaded device screw aperture, and the coupling aperture extends through the single piece screw coupler and is aligned with and surrounds the unthreaded device screw aperture.

4. The assembly of claim 3, wherein the device mounting plate has a longitudinal length complementing a width of said box, and where the coupling aperture and unthreaded device screw aperture are centrally located between said longitudinal ends.

5. The assembly of claim 4, wherein a radius of the first threaded portion is less than a radius of the unthreaded device screw aperture.

6. The assembly of claim 2, wherein the screw coupler comprises a first portion extending outwardly from the second side of the device mounting plate and being spaced inwardly from said first longitudinal end, and a second portion extending directionally toward said unthreaded aperture.

7. An apparatus for use in mounting an electrical device in an electrical device mounting box, comprising:
 a substantially planar plate having a first longitudinal end and a second longitudinal end, a first side and a rear side;
 two box screw mounting apertures extending through the plate at said first and second longitudinal ends;
 an unthreaded device screw aperture extending through the plate; and
 a flexible screw coupler extending outwardly from the rear side of the plate and spaced inwardly from said first and second longitudinal ends and comprising a flexible first arm and a flexible second arm extending toward each other and having terminal ends forming a coupling aperture there between, each terminal end having a threaded portion aligned with the unthreaded device screw aperture such that when a screw passes through the unthreaded device screw aperture and the coupling aperture, the screw threadedly engages with the screw coupler at the coupling aperture.

8. The apparatus of claim 7, wherein the plate comprises a metal mounting plate and the screw coupler comprises a metal screw coupler.

9. The apparatus of claim 7, wherein a radius of each threaded portion is less than a radius of the unthreaded device screw aperture.

10. The apparatus of claim 7, wherein a distance of the coupling aperture between peaks of a first threaded end and an opposing terminating end is less than a diameter of the unthreaded device screw aperture, and the two arms of the flexible screw coupler bias away from the second side of the mounting plate when a screw is pushed through screw coupler.

11. A method for mounting an electrical outlet receptacle to an electrical device mounting box, comprising:
 coupling a device mounting plate to an electrical device mounting box, the electrical device mounting box comprising four side walls bordering a front opening, and the device mounting plate comprising a first longitudinal end and a second longitudinal end, a front side and rear side, a box mounting aperture at each of said first longitudinal end and second longitudinal end, an unthreaded device screw aperture extending through the mounting plate and a flexible screw coupler spaced inwardly from said first and second longitudinal ends and spaced outwardly from a rear side of the device mounting plate, the screw coupler comprising a coupling aperture having a first threaded portion and aligned with the unthreaded device screw aperture;
 aligning a screw hole on a receptacle mount of an electrical outlet receptacle with the aligned unthreaded device screw aperture and coupling aperture;
 pushing a screw through the aligned screw hole of the receptacle mount, unthreaded device screw aperture, and coupling aperture until a head of the screw abuts the receptacle mount; and
 rotatably engaging the screw with the coupling aperture of the screw coupler after the screw has been pushed through the aligned screw hole of the receptacle mount, unthreaded device screw aperture, and coupling aperture to abut the receptacle mount.

12. The method of claim 11, wherein rotatably engaging the screw with the coupling aperture of the screw coupler comprises rotatably engaging the screw with the coupling aperture of the screw coupler, the screw coupler comprising a single piece screw coupler and the coupling aperture comprises an oblong hole through the single piece screw coupler, and said first threaded portion is formed at a first longitudinal end of said oblong hole.

13. The method of claim 11, wherein rotatably engaging the screw with the coupling aperture of the screw coupler comprises rotatably engaging the screw with the coupling aperture formed between two terminating ends of two opposing flexible arms of the screw coupler.

* * * * *